US011156273B2

(12) United States Patent
Pfeifer et al.

(10) Patent No.: US 11,156,273 B2
(45) Date of Patent: Oct. 26, 2021

(54) TENSIONING DEVICE AND METHOD WITH TORQUE ADJUSTMENT

(71) Applicant: Muhr und Bender KG, Attendorn (DE)

(72) Inventors: Simon Pfeifer, Plettenberg (DE); Joachim Jud, Daaden (DE)

(73) Assignee: Muhr und Bender KG, Attendorn (DE)

( * ) Notice: Subject to any disclaimer, the term of this patent is extended or adjusted under 35 U.S.C. 154(b) by 98 days.

(21) Appl. No.: 16/492,175

(22) PCT Filed: Mar. 28, 2018

(86) PCT No.: PCT/EP2018/057903
§ 371 (c)(1),
(2) Date: Sep. 9, 2019

(87) PCT Pub. No.: WO2018/178143
PCT Pub. Date: Oct. 4, 2018

(65) Prior Publication Data
US 2021/0018074 A1 Jan. 21, 2021

(30) Foreign Application Priority Data
Mar. 31, 2017 (DE) .................... 10 2017 107 047.8

(51) Int. Cl.
*F16H 7/12* (2006.01)
*F16H 7/08* (2006.01)

(52) U.S. Cl.
CPC ..... *F16H 7/1281* (2013.01); *F16H 2007/088* (2013.01); *F16H 2007/0865* (2013.01);
(Continued)

(58) Field of Classification Search
CPC ....... F16H 2007/0874; F16H 2007/081; F16H 2007/0893; F16H 7/1281; F02B 67/06
(Continued)

(56) References Cited

U.S. PATENT DOCUMENTS 4,758,208 A * 7/1988 Bartos .................. F16H 7/1281
474/135
4,808,148 A * 2/1989 Holtz ...................... F16H 7/129
474/112
(Continued)

FOREIGN PATENT DOCUMENTS

CN 105240471 A 1/2016
DE 3905218 C1 1/1990
(Continued)

OTHER PUBLICATIONS

International Search Report and Written Opinion for PCT/EP2018/057903 dated Jun. 20, 2018 (10 pages; with English translation).

*Primary Examiner* — Henry Y Liu
(74) *Attorney, Agent, or Firm* — Bejin Bieneman PLC

(57) ABSTRACT

A tensioning device for a traction drive comprises: a base member; at least one tensioning arm pivotably supported on the base member around a pivot axis, with a tensioning roller which is rotatably supported on a bearing carrier of the tensioning arm; spring means for resiliently loading the tensioning arm, wherein the spring means extend between a first spring support of the tensioning arm and a second spring support of the tensioning device over a circumferential length around the pivot axis; an adjusting mechanism for adjusting the first spring support relative to the bearing carrier of the tensioning roller in circumferential direction about the pivot axis. A method includes adjusting the torque of the tensioning device.

16 Claims, 9 Drawing Sheets

(52) U.S. Cl.
CPC ............... *F16H 2007/0874* (2013.01); *F16H 2007/0893* (2013.01); *F16H 2007/0897* (2013.01)

(58) Field of Classification Search
USPC .................................................. 474/134, 135
See application file for complete search history.

(56) References Cited

U.S. PATENT DOCUMENTS

| | | | | |
|---|---|---|---|---|
| 6,422,962 | B1* | 7/2002 | Lehtovaara | F16H 7/1236 |
| | | | | 474/101 |
| 6,609,989 | B2* | 8/2003 | Bogner | F02B 63/04 |
| | | | | 474/134 |
| 6,648,783 | B1* | 11/2003 | Bogner | F16H 7/1281 |
| | | | | 474/134 |
| 6,689,001 | B2* | 2/2004 | Oliver | F16H 7/1281 |
| | | | | 474/134 |
| 7,163,478 | B2* | 1/2007 | Oliver | F16H 7/1281 |
| | | | | 474/133 |
| 7,217,207 | B1* | 5/2007 | Hallen | F16H 7/129 |
| | | | | 474/101 |
| 7,320,262 | B2* | 1/2008 | Hallen | F16H 7/129 |
| | | | | 74/113 |
| 7,468,013 | B2* | 12/2008 | Di Giacomo | F16H 7/1281 |
| | | | | 474/134 |
| 7,892,125 | B2* | 2/2011 | Nelson | F16H 7/1254 |
| | | | | 474/134 |
| 7,901,310 | B2* | 3/2011 | Lolli | F16H 7/1281 |
| | | | | 474/134 |
| 8,821,328 | B2* | 9/2014 | Jud | F16H 7/1281 |
| | | | | 474/134 |
| 9,618,098 | B2* | 4/2017 | Ward | F16H 7/12 |
| 9,625,013 | B2* | 4/2017 | Wolf | F16H 7/1281 |
| 9,709,137 | B2* | 7/2017 | Walter | F16H 7/0831 |
| 9,759,293 | B2* | 9/2017 | Ryeland | F16H 7/1281 |
| 9,890,837 | B1* | 2/2018 | Martinez | F16H 7/12 |
| 9,976,634 | B2* | 5/2018 | Leucht | F16H 7/1245 |
| 10,024,403 | B2* | 7/2018 | Kim | F02N 19/00 |
| 10,520,066 | B2* | 12/2019 | Walter | F16H 7/1218 |
| 10,746,264 | B2* | 8/2020 | Singh | F16H 7/08 |
| 10,830,316 | B2* | 11/2020 | Singh | F16H 7/0829 |
| 10,876,605 | B2* | 12/2020 | Antchak | B60K 6/48 |
| 10,962,092 | B2* | 3/2021 | Liu | F16H 7/1281 |
| 2002/0039944 | A1* | 4/2002 | Ali | F16H 7/1218 |
| | | | | 474/135 |
| 2002/0086751 | A1* | 7/2002 | Bogner | F02B 67/06 |
| | | | | 474/134 |
| 2007/0099737 | A1* | 5/2007 | Hallen | F16H 7/129 |
| | | | | 474/101 |
| 2008/0070730 | A1* | 3/2008 | Nelson | F16H 7/1254 |
| | | | | 474/134 |
| 2008/0171622 | A1* | 7/2008 | Schever | F16F 1/042 |
| | | | | 474/135 |
| 2008/0234083 | A1* | 9/2008 | Haenbeukers | F16H 7/1281 |
| | | | | 474/135 |
| 2011/0312454 | A1* | 12/2011 | Comsa | F01L 1/024 |
| | | | | 474/110 |
| 2014/0287859 | A1* | 9/2014 | Frankowski | F16H 7/12 |
| | | | | 474/135 |
| 2015/0300462 | A1* | 10/2015 | Serkh | F16H 7/1281 |
| | | | | 474/112 |
| 2015/0308545 | A1* | 10/2015 | Harvey | F02B 67/06 |
| | | | | 474/117 |
| 2015/0337927 | A1* | 11/2015 | Benz | F16H 7/12 |
| | | | | 474/133 |
| 2015/0345597 | A1* | 12/2015 | Walter | F02B 67/06 |
| | | | | 474/134 |
| 2016/0146313 | A1* | 5/2016 | Ma | F16H 7/1218 |
| | | | | 474/135 |
| 2017/0146100 | A1* | 5/2017 | Walter | F02B 67/06 |
| 2018/0019638 | A1* | 1/2018 | Ben-Omrane | H02K 5/20 |
| 2018/0051779 | A1* | 2/2018 | Newman | F16H 7/1281 |
| 2018/0355955 | A1* | 12/2018 | Lee | F02B 67/06 |
| 2018/0363743 | A1* | 12/2018 | Chang | F16H 7/1281 |
| 2019/0078667 | A1* | 3/2019 | Liu | F16H 7/24 |
| 2019/0120345 | A1* | 4/2019 | Pfeifer | F16H 7/1281 |
| 2019/0186601 | A1* | 6/2019 | Lee | F02N 19/00 |
| 2019/0390749 | A1* | 12/2019 | Demir | F16H 7/08 |
| 2020/0132173 | A1* | 4/2020 | Mora | F16H 7/0831 |

FOREIGN PATENT DOCUMENTS

| | | |
|---|---|---|
| DE | 69901603 T2 | 1/2003 |
| DE | 10 2015 211 227 A1 | 12/2016 |
| EP | 2128489 A2 | 12/2009 |
| EP | 2573423 A1 | 3/2013 |
| EP | 3023670 A1 | 5/2016 |
| JP | 2008512610 A | 4/2008 |
| JP | 2012518140 A | 8/2012 |
| KR | 10-2011-0121636 | 11/2011 |

* cited by examiner

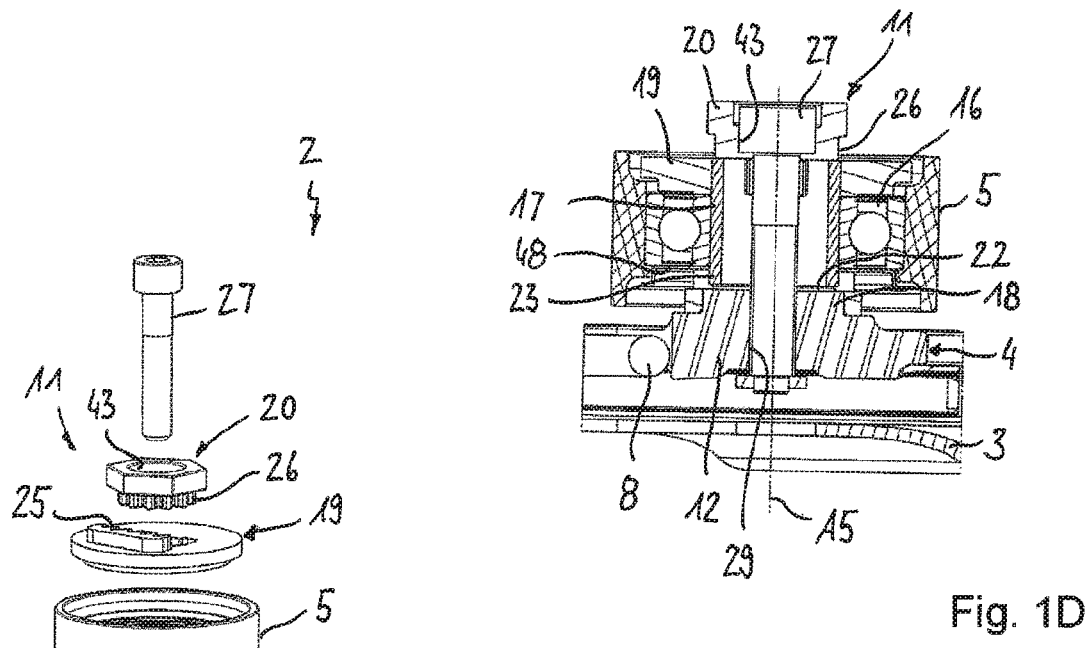
Fig. 1D
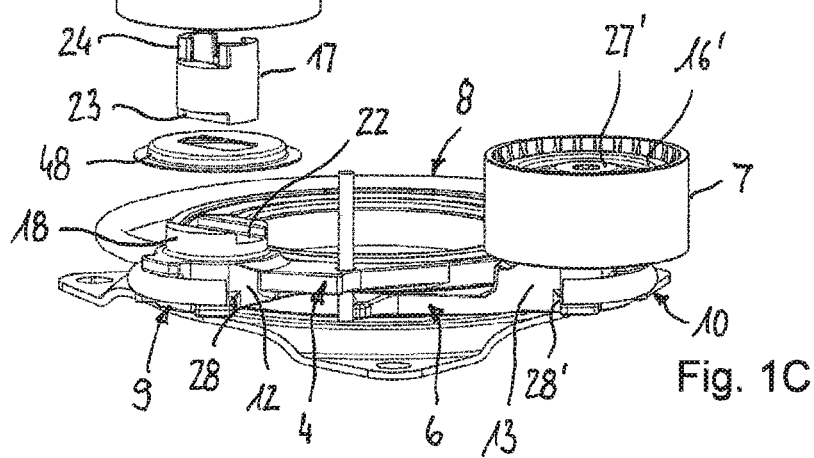
Fig. 1C
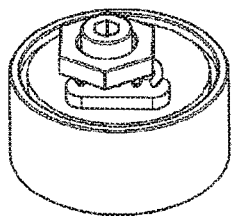
P1
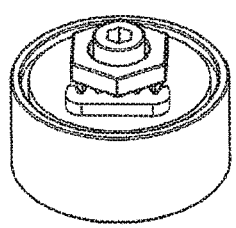
P0
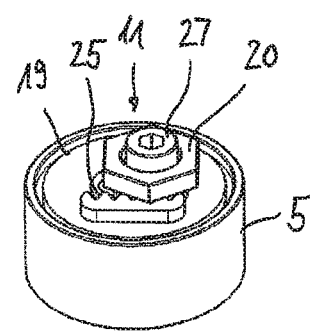
P2  Fig. 1E

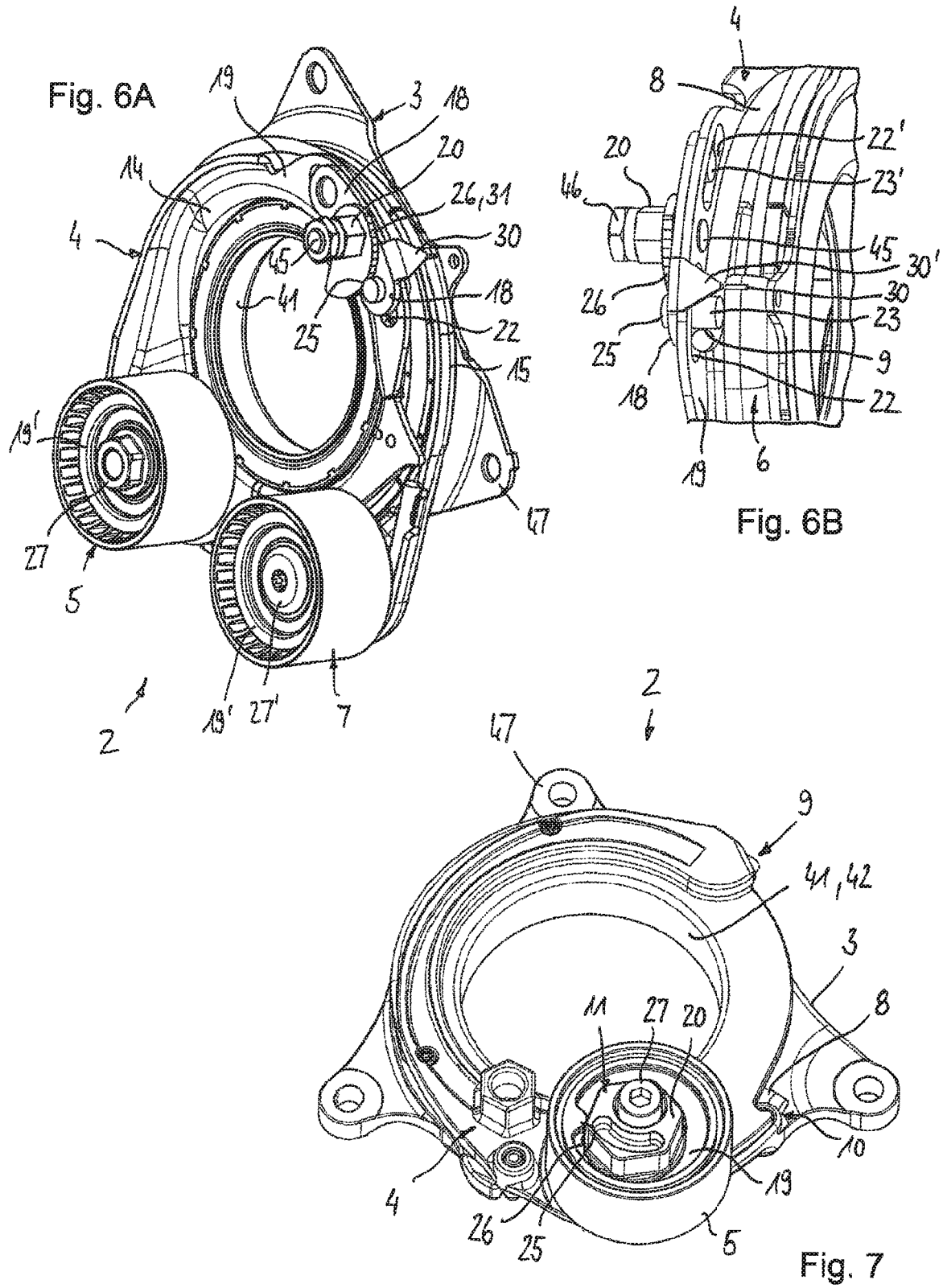

TENSIONING DEVICE AND METHOD WITH TORQUE ADJUSTMENT

CROSS-REFERENCE TO RELATED APPLICATIONS

This application is a national stage of, and claims priority to, Patent Cooperation Treaty Application No. PCT/EP2018/057903, filed on Mar. 28, 2018, which application claims priority to German Application No. DE 10 2017 107 047.8, filed on Mar. 31, 2017, which applications are hereby incorporated herein by reference in their entireties.

BACKGROUND

A traction drive, also known as a belt drive or chain drive—is a drive in which a torque is transmitted between two or more shafts via a traction means. Generally a traction drive has an endless traction means and at least two pulleys around which it is wrapped, of which one can function as a drive and one as an output of the traction means.

A distinction is made between force-fitting and form-fitting traction drives. In force-fitting traction drives, the torque is transmitted by the frictional forces acting in the contact face between the belt and the pulley. In form-fitting traction drives, i.e. chain drives or toothed belt drives, the torque is transmitted by pulleys with a respective form-fitting profile onto or from the traction means.

Traction drives in form of belt drives are used on combustion engines of motor vehicles for driving auxiliary units, wherein a first belt pulley is mounted on the crankshaft of the combustion engine and drives the belt. Further pulleys are assigned to the auxiliary units, such as, for example, a water pump, electric generator, or air-conditioning compressor, and are rotatingly driven by the belt drive. Between the crankshaft and the auxiliary unit adjoining the crankshaft in a circumferential direction of the belt, generally the generator, the slack side is formed. To ensure a sufficient wrap of the belt around the belt pulley, the belt is pretensioned by a tensioning roller of the tensioning device.

From EP 2 128 489 A2 A1, a tensioning device for a belt drive with a starter-generator is known. The tensioning device has a housing, in which two tensioning arms are pivotably supported around a common pivot axis. The tensioning arms are supported against each other by spring means. The housing is mountable, when the drive belt pulley is mounted on the starter-generator, such that the housing is contact-free with respect to the starter-generator in an annular portion enclosing the drive shaft of the starter-generator.

From EP 2 573 423 A1 a belt tensioning device is known, which has a base member with a tensioning arm pivotably supported thereon. The belt tensioning device is formed such that the pivot axis of the tensioning arm is arranged in the mounted condition within the outer diameter of the belt pulley of the accessory.

From DE 10 2015 211 227 A1 a tensioning device for a traction drive of a combustion engine is known. The tensioning device comprises two tensioning arms, which are rotatable relative to each other and each have a tensioning roller, a spring device, which biases the two tensioning rollers towards each other, and an actuator for rotating the tensioning arms towards each other. The actuator is formed as an electro-motor, which is controllable during operation to adjust the tensioning rollers in a targeted manner.

From DE 39 05 218 C1 an adjusting device for adjusting the belt tension of the drive belt of a motor vehicle is known. The adjusting device has a tensioning element, formed as a pinion, and a counter tensioning element in form of a toothed gear, with which the tensioning element engages. By turning the tensioning element, the electric generator is pivoted relative to the vehicle engine and thus adjusted in the plane of the drive belt.

US 2008/0070730 A1 describes a device for clamping a flexible drive element. The device, with a pair of opposite contact elements, is in contact with an upper and a lower span of the flexible drive element. The device comprises a connecting element in the form of a spring clip to pull the contact elements together and position the contact elements at a selected distance from each other to provide a predetermined tension to the flexible drive element.

Belt drives are subjected to static strand force variations, which are caused by production tolerances in the belt length, the diameter and position tolerances of the pulleys relative to each other and torque tolerances of the belt tensioner spring. This applies for conventional belt tensioners with one tensioning arm as well as for belt tensioners with pendulum arms in belt driven starter-generator-applications.

Due to the static deviations of the strand forces, the components of a belt drive have to be robustly designed for a wide range between a minimum and a maximum strand force. Relatively high strand forces are required for slip-free power transmission.

SUMMARY

The present disclosure relates to a tensioning device for a traction drive and a method for adjusting the torque of such a tensioning device. A tensioning device for a traction drive is disclosed that enables a reduction of the strand forces of the traction drive or a design of the belt drive to lower strand forces. A corresponding method for adjusting the torque of such a tensioning device is also disclosed.

A tensioning device for a traction drive comprises: a base member for connecting to a stationary component; at least one tensioning arm pivotably supported relative to the base member around a pivot axis, with a tensioning roller rotatably supported on a bearing carrier of the tensioning arm; spring means for resiliently loading the tensioning arm, wherein the spring means extend between a first spring support of the tensioning arm and a second spring support of the belt tensioning device about the pivot axis; and an adjusting mechanism for adjusting the first spring support relative to the bearing carrier of the tensioning roller circumferentially about the pivot axis.

An advantage of the tensioning device is that the adjusting mechanism enables an adjusting or change of the span force of the traction drive. This is achieved in that the first spring support is movable in a circumferential direction relative to the bearing carrier or to the tensioning roller connected thereto. Thus, also the circumferential length between the first spring support and the second spring support is changed, so that the spring preload force is changed. The specification in the circumferential direction should in particular comprise any adjusting movement that has a component in the circumferential direction. The strand force applied to the traction means can be limited to the value required for a slip-free power transmission, so that the frictional losses can be reduced accordingly, which has an advantageous effect on the efficiency of the belt drive. The second spring support is assigned to a component of the belt tensioner, relative to which the (first) tensioning arm is pivotable. In particular, this can be another (second) tensioning arm or the base member.

Accordingly, when the tensioning device is mounted, the angle between the first spring support and the second spring support is changed with respect to the pivot axis of the tensioning arm. In the mounted condition of the tensioning device, the tension pulley is held stationary relative to the component against which the spring means are supported.

The traction drive is designed to transmit torque between two or more shafts by means of an endless traction device. In particular, the traction drive may be configured in the form of a belt drive, a toothed belt drive or a chain drive.

The adjusting mechanism is designed to adjust the first spring support in circumferential direction around the pivot axis relative to the bearing carrier, or to the tensioning roller supported thereon. For this, the adjusting mechanism can have a setting element, rigidly connected to the spring support, and a supporting element, rigidly connected to the bearing carrier, wherein the setting element is adjustably guided relative to the supporting element in a circumferential direction around the pivot axis, and an actuating element for adjusting the setting element relative to the supporting element. A rigid connection means in particular that said components are non-movable relative to each other and in particular can be integrally formed. For the design and arrangement of the setting element, of the supporting element and of the actuating element, various options are possible, for example the following.

According to a first embodiment, the actuating element can be rotatably attached to the tensioning arm and can be designed with an actuating structure for being rotated. The actuating structure of the actuating element can interact with a counter-structure of a counter-component connected to the bearing carrier for common movement, i.e., such that rotation of the actuating element and the actuating structure non-rotatably connected thereto causes a circumferential movement of the tensioning arm relative to the bearing carrier in circumferential direction about the pivot axis. According to a first possibility, the actuating structure can be formed as a toothed structure which interacts with a tooth segment of the counter-component, wherein the counter-component is an upper cover disc for the tensioning roller. In this case, a turning of the toothed structure causes in particular a linear movement of the counter-component and of the bearing carrier connected thereto. According to a second possibility, the actuating element can have an eccentric face structure as actuating structure, which interacts with a counter-face of the counter-component, wherein the counter component is an upper cover disc for the tensioning roller. The eccentric face structure can for example be formed as an eccentric setting curve, so that by rotating the actuating element an adjustment of the bearing carrier relative to the tensioning arm is effected. For both possibilities, the bearing carrier can have a circumferentially elongated axial through opening through which an attachment element, such as a screw, can be passed for connecting the tensioning roller to the tensioning arm. The elongated through opening allows a circumferential movement of the bearing carrier relative to the tensioning arm, when the actuating element is rotated.

According to a further embodiment, the actuating element can be fixedly connected to the bearing carrier, and the bearing carrier can be connected to a lower cover disc for the tensioning roller in a rotationally fixed manner, wherein the actuating structure is formed on the lower cover disc as an eccentric face structure, and wherein the counter-structure is formed on the tensioning arm as a counter-face, on which the eccentric face structure is supported.

In the force transmission path between the actuating element and the setting element, engagement means can be provided that are configured to hold the setting element in defined positions with respect to the supporting element. The position of the engagement means, which can also be designated as engagement mechanism, is in principle arbitrary within the force transmission path. In this context, the force transmission path refers to all components that are arranged for transmitting force between the actuating element and the setting element.

According to an embodiment, the adjusting mechanism can be designed such that the first spring support and the tensioning roller are adjustable relative to each other by up to 10° about the pivot axis. This adjustment range should be however sufficiently large to adjust the strand forces to the desired value, taking into account all positional and manufacturing tolerances of the components influencing the strand forces. In more concrete terms, it can in particular be provided that the first spring means and the tensioning roller are adjustable starting from a central starting position by up to ±5° around the pivot axis. Thereby it is advantageously achieved that the spring means can be varied or adjusted in both directions starting from the central position. This means that the strand forces can be increased or reduced according to the requirement.

The adjusting mechanism can be formed such that the adjustment takes place at least substantially in a circumferential direction. In particular, this shall include that the adjustment takes place on a circumferential curve or a straight line approximately tangential to the pivot axis. According to an embodiment, a stop is formed between the first spring support and the spring means, wherein the adjusting mechanism is in particular designed such that, starting from an initial position, the stop is movable within an angle range of up to ±10° relative to a tangent in circumferential direction about the pivot axis (A). In this case, the tangent can be defined as a perpendicular to the radius from the pivot axis to the stop. Instead of the stop, a different element connected to the tensioning arm can also be considered as a reference point. By adjusting the spring support substantially in the circumferential direction, the effective direction of the pretensioning forces acting from the tensioning roller onto the traction means remains substantially unchanged.

The spring means are designed and arranged to load the at least one tensioning arm in circumferential direction. At least one spring can be provided, i.e., one or more springs, extending preferably around the longitudinal axis. The spring can be formed in particular as a bending spring, which extends in circumferential direction around the pivot axis of the tensioning arm with a radial distance. A bending spring means a spring which is substantially subjected to bending under load. The bending spring extends in circumferential direction about the pivot axis between the first spring support and the second spring support along a circumferential extension of in particular less than 980° (three windings), preferably less than 720° (two windings), if necessary less than 360° (one winding). The radius of the bending spring can vary along the circumferential extension. Examples of a bending spring are a bow spring which extends in the circumferential direction by preferably less than 360° around the pivot axis, or a coil spring which can extend by more than 360° and/or less than 980° around the pivot axis. For a compact design it is advantageous if the ratio of the nominal diameter of the coil spring to the axial length of the coil spring is, in the assembled condition, larger than 4.0, in particular larger than 5.0.

The design and arrangement of the second spring support depends on the type of belt tensioner, which can be formed as a one-arm tensioner or a two-arm tensioner. In a one-arm tensioner exactly one tensioning arm is provided, which is resiliently supported in a circumferential direction via the spring means against the base member. In this embodiment the second support face, on which the spring means are supported in the circumferential direction, is accordingly assigned to the base member.

A two-arm tensioner has two tensioning arms, namely a first tensioning arm with a first tensioning roller and a second tensioning arm with a second tensioning roller, wherein the two tensioning arms are supported against each other in the circumferential direction by the springs means. The second tensioning arm with the second tensioning roller loads the traction means. The two tensioning arms can be pivotably supported relative to each other and/or relative to the base member about a respectively own pivot axes, or a common pivot axis. In this embodiment with two tensioning arms, the second support face, against which the spring means are supported in the circumferential direction, is assigned to the second tensioning arm, so that the two tensioning arms are resiliently supported relative to each other in the circumferential direction by the spring means.

Two-arm tensioners are used in belt drives in which a starter-generator is integrated into the belt drive as an auxiliary unit, i.e., an electric motor that can be operated depending as a starter (starter motor) or as an alternator (generator) depending on the operation condition. In normal or motor operation, the belt pulley on the crankshaft is the driving pulley, while the starter-generator and the other units are driven. In start or the starter operation, the starter-generator drives the crankshaft via the associated pulley to start the combustion engine. In such belt drives with starter-generator as an auxiliary unit, there is an alternation between the motor operation on the one hand and the starter operation on the other hand between the tension strand and the slack strand on both sides of the belt pulley of the starter-generator. It is therefore necessary to provide spring-loaded tensioning rollers for both of said strands and provide thus two tensioning arms, of which respectively one is effective on the slack strand under spring force, while the other is pushed back from the tension strand.

According to an embodiment the base member and/or the at least one tensioning arm can have an opening, into which a drive shaft and/or a belt pulley of an accessory can extend in the mounted condition. The base member can be designed as a steel component, in particular as a sheet metal formed part. Thus, it is achieved in an advantageous manner a high strength and rigidity at low material consumption. The base member can have one or more attachment portions, which project in particular flange-like from the portion enclosing the opening and through which the drive shaft is passed. It is advantageous, if several attachment points are provided at which the base member can be connected to the accessory.

A method for adjusting the torque of a tensioning device comprises a tensioning arm pivotable about a pivot axis relative to another component of the tensioning device, a tensioning roller, spring means via which the tensioning arm is supported against the component in circumferential direction, and an adjusting mechanism for adjusting the tensioning arm relative to the tensioning roller, with the following steps: determining a target torque which the tensioning device shall have in the mounted condition; measuring the actual torque of the tensioning device across a pivot angle of the tensioning arm when pivoting the tensioning arm relative to the component against which the spring means are supported; pivoting the tensioning arm relative to the component to a target pivot angle at which the target torque is applied; and applying a mark on the tensioning device representing the target pivot angle.

With this method, the spring load of the tensioning device can always be set to the nominal torque value. In other words, the tensioning device can be adjusted in the assembled condition to the lowest possible strand forces needed for a slip-free power transmission in the belt drive. The tensioning device and the method can be used to compensate for static strand force tolerances that can occur, for example, due to manufacturing-, positional, and spring torque tolerances. The method and the device are elements of a uniform concept, so that all features of the method can be applied to the device and, vice versa, all features of the device can be applied to the method. In particular, the method can be carried out with the tensioning device according to the present disclosure, which can have one or more of the above embodiments.

The target torque can, for example, be calculated or specified by the user. The calculation of the target torque can be carried out, for example, based on the performance data of the belt drive, such as the torque to be transmitted by the traction means, the degree of wrap on the drive belt pulley, the type of traction means, the nominal torque of the accessory, and so on. The measuring of the torque of the tensioning device can be carried out by a suitable measuring device which measures the spring torque over the pivot angle of the tensioning arm. From this, a torque-tensioning angle curve can be derived for the respective tensioning device. In this case, the torque generated by the tensioning device increases accordingly with increasing pivoting of the tensioning arm against the spring support due to increasing spring load. By means of the torque-tensioning angle curve, a corresponding torque is assigned to each pivot angle of the tensioning arm. To set the desired target torque, the tensioning arm is transferred to the corresponding pivot position or angle position. In this position, a marking is applied to the tensioning device, which enables that the tensioning arm can be reproducibly pivoted into the required angle position, without renewed torque measurement.

The marking may, for example, be configured as an optically and/or haptically perceptible marking, which may be applied, for example, by paint, etching, thermal treatment by laser or in a similar manner. In particular, it may be provided that a first marking element is assigned to the tensioning arm and a second marking element is assigned to the component, relative to which the tensioning arm is pivotable, which marking elements are arranged axially opposite to each other in the desired angular position.

In a subsequent step, the tensioning device is assembled in a belt drive. For this, the tensioning device is mounted on a stationary component, the belt is wrapped around all drive belt pulleys, and the tensioning roller is loaded against the belt under spring pre-tension. Now, the tensioning arm can be adjusted relative to the tensioning roller by means of the adjusting mechanism until the marking representing the target pivot angle is reached or the marking elements are aligned with each other. In this setting position, the adjusting mechanism is fixed. Now the desired target torque is now applied.

BRIEF SUMMARY OF THE DRAWINGS

Example embodiments are described below using the drawing figures, which show:

FIG. 1C: the belt tensioning device of FIG. 1A with adjustable tensioning roller in an exploded view, FIG. 1D: the adjustable tensioning roller of the belt tensioning device of FIG. 1A as detail in longitudinal section, FIG. 1E: the adjustable tensioning roller of the belt tensioning device of FIG. 1A in different adjustment positions (P0, P1, P2), FIG. 6A: a belt tensioning device in a further embodiment in a perspective view, when seen diagonally from the front, FIG. 6B: a detail of the belt tensioning device of FIG. 6A in a perspective lateral view on the adjusting mechanism;

FIG. 7: a belt tensioning device in a further embodiment in a perspective view, when seen from diagonally above;

DESCRIPTION

Figures 1A, 1B:
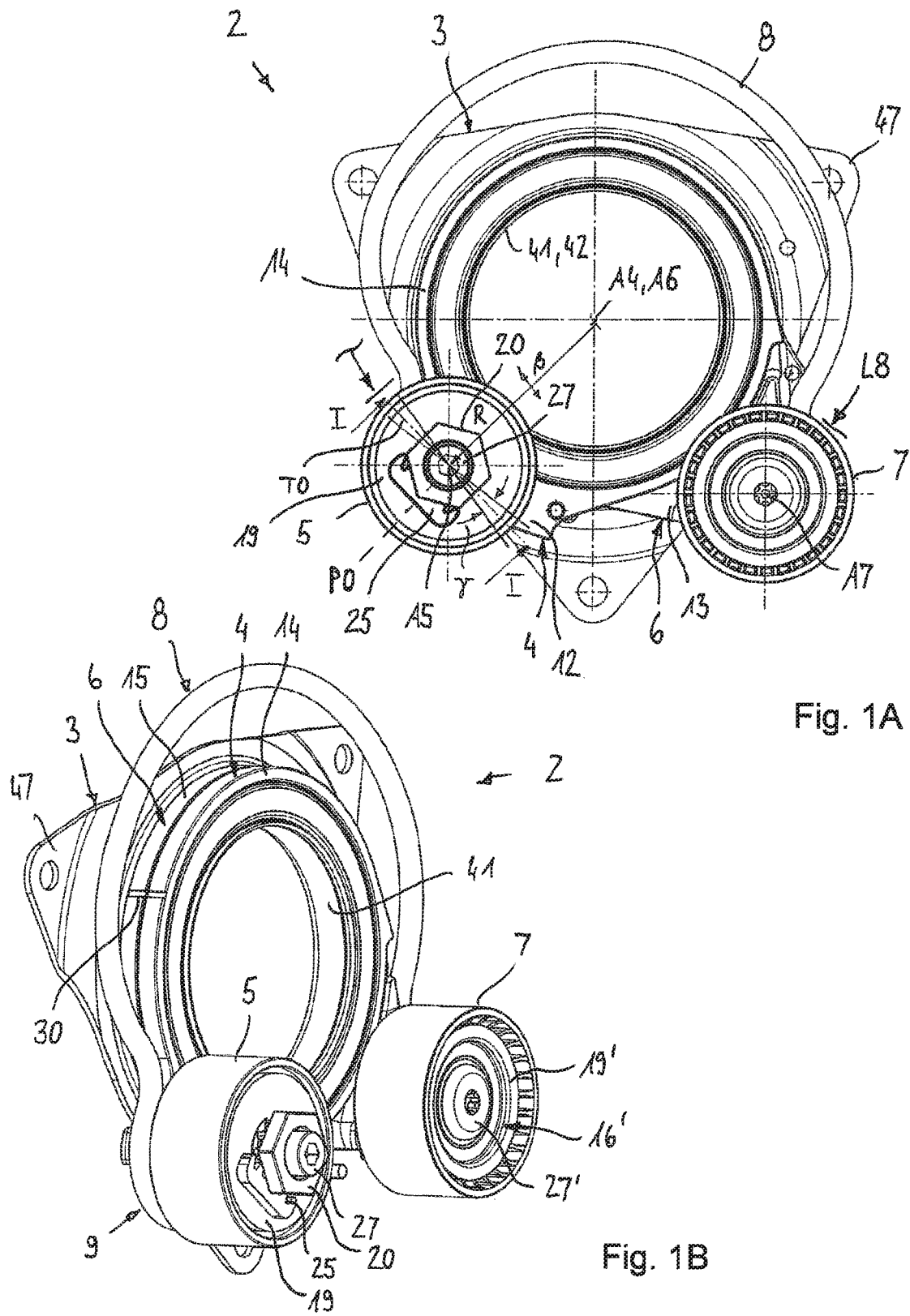
FIG. 1A: a belt tensioning device according to a first embodiment in an axial view.
FIG. 1B: the belt tensioning device of FIG. 1A in a perspective view.

FIGS. 1A to 1E, which are described together with FIGS. 2 and 3 in the following, show a belt tensioning device 2 in a first embodiment. The belt tensioning device 2 comprises a base member 3, a first tensioning arm 4 with a first tensioning roller 5, a second tensioning arm 6 with a second tensioning roller 7, and a spring 8 via which the two tensioning arms 4, 6 are resiliently supported against each other in a direction of rotation. The spring 8 extends between a first spring support 9 of the first tensioning arm 4 and a second spring support 10 of the second tensioning arm 6 along a circumferential length L8. An adjusting mechanism 11 is provided to adjust the first spring support 9 relative to the first tensioning roller 5 in a circumferential direction. By means of the adjusting mechanism 11, which will be described in greater detail below, the circumferential length L8 between the two spring supports 9, 10 and thus the spring preload acting between the tensioning rollers 5, 7, respectively the torque, can be changed.

The base member 3 can be attached on a stationary component such as an accessory. The accessory can in principle be any machine that is part of the belt drive, i.e., in particular any auxiliary units driven by the main engine of the motor vehicle, such as a generator, water pump or the like. For connection to the stationary component, the base member 3 has several attachment portions 47, distributed around the circumference, which are designed in particular as radially outwardly projecting flange projections with bores through which screws can be inserted for attaching to the stationary component. The two tensioning arms 4, 6 of the belt tensioning device 2 are rotatably supported relative to each other or relative to the base member 3 about a pivot axis A4, A6 by respective bearing means. The base member 3, the first tensioning arm 4 and/or the second tensioning arm 6 are preferably designed as steel components, which can in particular be formed from sheet metal.

The first tensioning arm 4 is pivotably supported by means of a first bearing around a first pivot axis A4. The second tensioning arm 6 is pivotably supported by means of a second bearing around a second pivot axis A6. Here, the two bearings are arranged coaxially to each other, i.e. the two pivot axes A4, A6 coincide. Generally, however, it is also possible for specific applications that the two pivot axes can be arranged parallel or eccentrically to each other.

The spring 8 extending in the circumferential direction around the pivot axes A4, A6, counteracts a relative pivot movement of the two tensioning arms 4, 6. The two tensioning arms 4, 6 are rotatable relative to each other to a limited extent due to the intermediate spring 8 and, together with the spring 8, can rotate freely around the axes A4, A6, i.e. around 360° or more, relative to the base member 3. It is provided that, in the mounted condition of the belt tensioning device 2, the pivot axes A4, A6 are arranged within the opening 41 of the base member 3.

The tensioning arms 4, 6 each have a carrier portion 12, 13 which projects radially outwards from an annular bearing portion 14, 15 of the respective tensioning arm 4, 6. On the respective carrier portion 12, 13, an associated tensioning roller 5, 7 is attached and is rotatably supported by means of respective bearings 16, 16' around the rotational axes A5, A7 extending parallel to the pivot axes A4, A6. The bearing 16' for the second tensioning roller 7 is mounted on a bearing receptacle rigidly connected to the carrier portion 13. The bearing 16' is clamped by means of a screw 27' to the carrier portion 13. Upper and lower discs 19, 19' prevent dirt from entering into the bearings 16, 16' of the tensioning rollers 5, 7.

A special feature of the present embodiment is the design of the first tensioning roller arrangement, which comprises the first tensioning roller 5 and the adjusting mechanism 11 in a compact unit.

The first tensioning roller 5 is rotatably supported on a first bearing carrier 17 of the first tensioning arm 4 so as to be rotatable around a rotational axis A5. The bearing carrier 17 can be adjusted relative to the tensioning arm 4 by means of the adjusting mechanism 11 and can be fixed in the required position. By moving the tensioning arm 4 relative to the bearing carrier 17, the first spring support 9 connected to the tensioning arm is moved accordingly in the circumferential direction relative to the tensioning roller 5. Depending on the movement direction, this causes an expansion or contraction of the spring 8, so that the spring force and thus the torque that can be generated by the belt tensioner 2 can be changed.

The adjusting mechanism 11 comprises a setting element 18 which is connected to the spring support 9, a supporting element 19 connected to the bearing carrier 17, and an actuating element 20 for adjusting the setting element relative to the supporting element. The supporting element 19 is supported on one side on the setting element 18 and on the other side on the actuating element 20 in the circumferential direction, which also includes an indirect support.

In the present embodiment, the setting element 18 is designed in the form of a projection which projects axially from the tensioning arm 4 and which has a guide contour 22 extending in the circumferential direction. The bearing carrier 17 engages in the counter-contour 23 with a matching guide contour 22, so that the bearing carrier 17 is guided relative to the tensioning arm 4 in the circumferential direction, respectively tangentially relative to the pivot axis A4. Here, the guide contour 22 and the counter-contour 23 are formed according to the groove-tongue principle, without being limited thereto.

The bearing carrier 17 is connected with its upper end to the supporting element 19, in particular by means of a form-fitting connection. For this, the bearing carrier 17 has engagement means 24, which engage in a corresponding opening of the supporting element 19 in a rotationally fixed manner. Because of the form-fitting connection, it is achieved that the bearing carrier 17 moves together with the supporting element 19 when the latter is adjusted by means of the actuating element 20. Presently, the supporting element 19 is designed in the form of a cover disc which has at an upper end face a toothed rack segment 25 which interacts with a corresponding toothed structure 26 of the actuating element 20. The cover disc 19 is arranged coaxially to the bearing carrier 17 and thus also coaxially to the tensioning roller 5 and covers the bearing 16 towards the top to prevent a penetration of dirt. At a lower side of the tensioning roller 5 a further cover disc 48 is provided.

The actuating element 20 is designed here as a toothed nut having an outer toothing as actuating structure as well as an outer contour, in particular an external hexagon, for introducing a torque. The actuating element 20 has a central through opening 43, through which an attachment element 27 is inserted. The attachment element 27, which is formed as a screw (without being limited thereto), is passed through the elongated through opening of the bearing carrier 17 and screwed into the tensioning arm 4. Thus, the actuating element 20 is rotatably supported on the screw 27.

A turning of the actuating element 20 causes, due to the inter-engaging teeth 25, 26, a relative movement of the supporting element 19, of the bearing carrier 17 connected thereto and the tensioning arm 5 connected thereto, relative to the attachment element 27 and of the tensioning arm 4 connected thereto via the attachment element 27, along the guide 22, 23. The movement takes place approximately in the circumferential direction around the pivot axis A4. In FIG. 1E different setting positions are shown, into which the tensioning roller 5 can be adjusted starting from a central position relative to the attachment element 27. A central setting position is shown in the middle. If, starting from this position, the actuating element 20 is turned counter-clockwise (left representation), the attachment element 27 and with it also the tensioning arm 4 connected thereto, are accordingly pushed clockwise away from the tensioning roller 5 around the pivot axis A4. The spring 8 expands so that the torque generated by the spring is increased. If, opposite thereto, the actuating element 20 is turned clockwise starting from the central position (right representation), the attachment element 27 and with same the tensioning arm 4 connected thereto, are moved accordingly counter-clockwise around the pivot axis A4 relative to the tensioning roller 5. The spring 8 contracts, so that the torque produced by the spring is reduced.

The adjusting mechanism 11 has to be configured such that the adjustment range between the two end positions P1, P2 is sufficiently large, to adjust the torque that can be generated by the belt tensioning device 2 to the required value, taking into account all position and manufacturing tolerances of the components of the belt tensioner. For example, the adjusting mechanism 11 can be designed such that the first spring support 9 and the tensioning roller 5 are adjustable in opposite directions to each other by an angle range β of up to 10° around the pivot axis A4. In particular it is provided that the first spring support 9 and the tensioning roller 5 are adjustable, starting from a central starting position (P0), by up to ±5° about the pivot axis A4 to opposite end positions (P1, P2). In this manner, the torque of the spring 8 and thus the belt run forces can be enlarged or reduced according to requirements.

The adjustment direction is here defined by the guide 22, 23 between the setting element 18 and the bearing carrier 17, which, in this case, is formed straight and extends tangentially to the pivot axis A4. It is to be understood that the adjustment can also be carried out in a non-straight manner, in particular curved, also deviating from a tangent. The adjusting mechanism 11 can be designed such that the adjustment is carried out at least substantially in the circumferential direction. This means in particular that a reference point of the first tensioning arm 5, for example a stop 28 for the spring 8 or the threaded bore 29 for the attachment screw 27 has, starting from an initial position (P0), a movement direction which, in axial view, lies within an angle range γ of up to ±10° relative to a tangent T0 around the pivot axis A4. The tangent T0 can be defined as a perpendicular to the radius R starting from the pivot axis A4 to the reference point.

To be able to carry out the adjustment of the target torque of the belt tensioner 2 during final assembly in the belt drive in a simple manner, according to a possible method, a pre-adjustment is carried out during the assembly and testing of the belt tensioner 2. This is described below with reference to the belt tensioner 2 of FIG. 1 by taking into account FIGS. 2 and 3.

For a reproducible adjustment of a target torque, which is also designated as nominal torque, initially the actual torque M of the tensioning device 2 is measured across a pivot angle α of the tensioning arm 5 during pivoting against the second tensioning arm 6. This results in a torque tension angle curve ispring for the respective tensioning device 2, as shown schematically in FIG. 2. It can be seen that the torque M, generated by the tensioning device 2, which substantially corresponds to the spring torque, increases accordingly with increasing pivot angle α of the tensioning arm 4 in direction of the second spring support. In this case a corresponding torque M can be assigned to each relative pivot angle α by means of the torque tension angle curve (ispring). To set the required nominal torque, the tensioning arm 4 is transferred into the associated pivot position (P0) or angle position (αset). In this position, a marking 30 is applied to the tensioning device 2, which enables that the tensioning arm can be reproducibly pivoted to the required angle position, without renewed torque measurement, and that the required nominal torque Mset can be set. The marking 30 is shown in FIG. 1B; it can be seen that this is formed as a line, which has a portion on the first tensioning arm 4 and a portion on the second tensioning arm 6, wherein the two line portions are aligned with each other in the target angle position αset. The target torque is for example determined on the basis of the performance characteristics of the belt drive.

Figure 3:
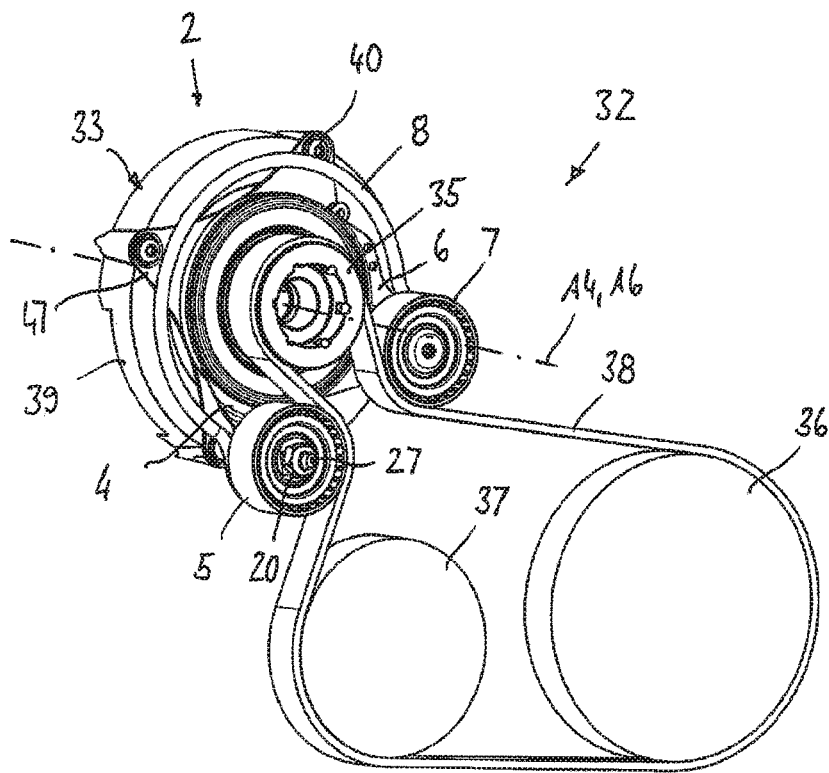
FIG. 3: a belt drive with a belt tensioning device of FIG. 1, FIG. 4A: a belt tensioning device in a second embodiment in an axial view.

In a subsequent step, the tensioning device 2 is assembled in a belt drive 32, as for example shown in FIG. 3. For this, the tensioning device 2 is attached on a stationary component, presently an accessory 33, the belt 34 is placed around all drive belt pulleys 35, 36, 37, and the tensioning roller 5 is loaded under spring pretension against the belt 38. Then the tensioning arm 4 can be adjusted relative to the tensioning roller 5 by means of the adjusting mechanism 11 until the marking 30 representing the target angle position αset is reached or the marking elements are aligned with each other. Now the desired torque Mset is attained. In the present embodiment, the accessory 33 is designed in the form of a generator (alternator). The housing 39 of the generator can be seen, which can be connected to an engine block. The belt tensioning device 2 is attached to an end face of the generator 33. This is done by means of circumferentially distributed attachment flanges 47, into which screws 40 can be inserted and screwed to the housing 39 of the generator. Furthermore, the endless belt 34 and the belt pulley 35, which is connected to the drive shaft of the generator 33 in a rotationally fixed manner, can be seen. The base member 3, respectively the belt tensioning device 2, is formed such that—in the mounted condition of the belt tensioning device 2 to the accessory 33—the pivot axes A4, A6 of the tensioning arms 4, 6 are arranged within the outer diameter of the drive shaft.

FIGS. 4A to 4D, which are jointly described below, show a tensioning device 2 in a second embodiment. The present tensioning device 2 widely corresponds to the embodiment according to the FIGS. 1 to 3, so that reference is made to the above description with regard to the common features. The same and, respectively, corresponding components are provided with the same reference numerals, as in FIGS. 1 to 3.

The present belt tensioner 2 according to FIG. 4 differs from the above embodiment in the design of the adjusting mechanism 11, in particular of the supporting element 19 and the actuating element 20.

In the present embodiment, the actuating element 20 is designed in the form of an eccentric nut, which has an actuating structure 26 in form of an eccentric face, which is arranged eccentrically to the through bore for the screw 27. The actuating element 20 interacts with the supporting element 19 as a counter-component, which is formed in the shape of an upper cover disc for the tensioning roller 5. The cover disc 19 has a support face 25, contacting the eccentric face 26. When the eccentric nut 20 is turned, the eccentric setting curve 26 moves along the support face 25 so that the cover disc 19 is moved relative to the screw 27 in relation to the pivot axis A4 approximately in circumferential direction. Accordingly, the bearing carrier 17, with is fixedly connected to the cover disc 19, and the tensioning roller 5 move relative to the screw 27 and the associated tensioning arm 4 along the guide 22, 23 formed between the bearing carrier 17 and the setting element 18. Depending on the direction of rotation of the eccentric nut 20, the eccentric setting curve 26 can be rotated from a central setting position into areas of smaller radii or larger radii, so that the spring 8 can be expanded or contracted accordingly.

Figure 4A:
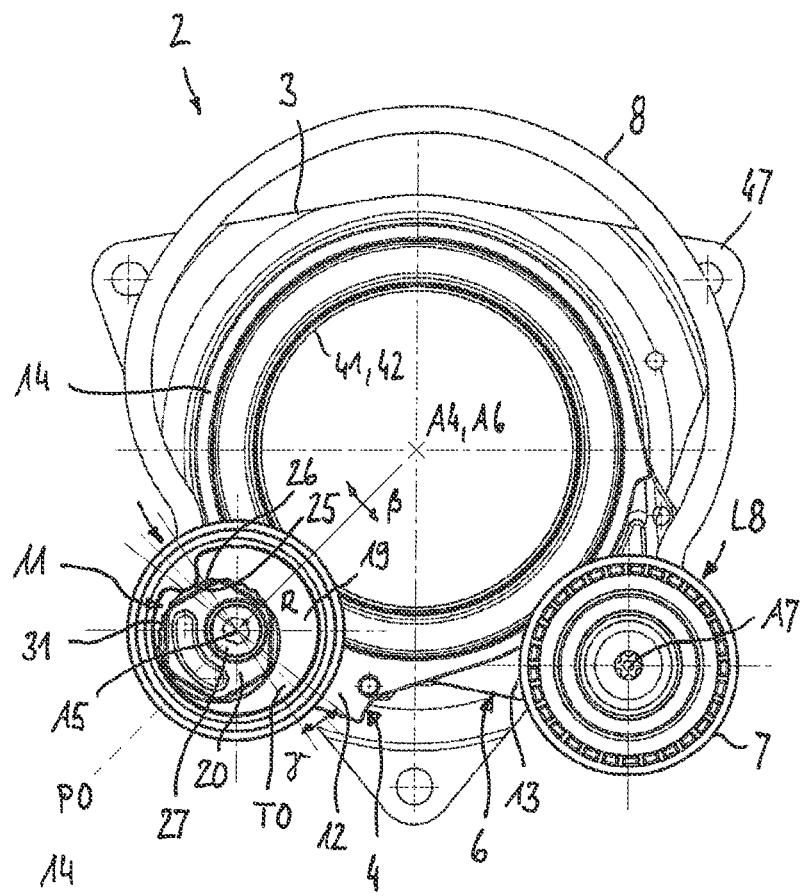
FIG. 4B: the belt tensioning device of FIG. 4A in a perspective view.
FIG. 4C: the belt tensioning device of FIG. 4A with adjustable tensioning roller in an exploded view.
FIG. 4D: the adjustable tensioning roller of the belt tensioning device of FIG. 4A as a detail in a longitudinal section.
Figure 4B:
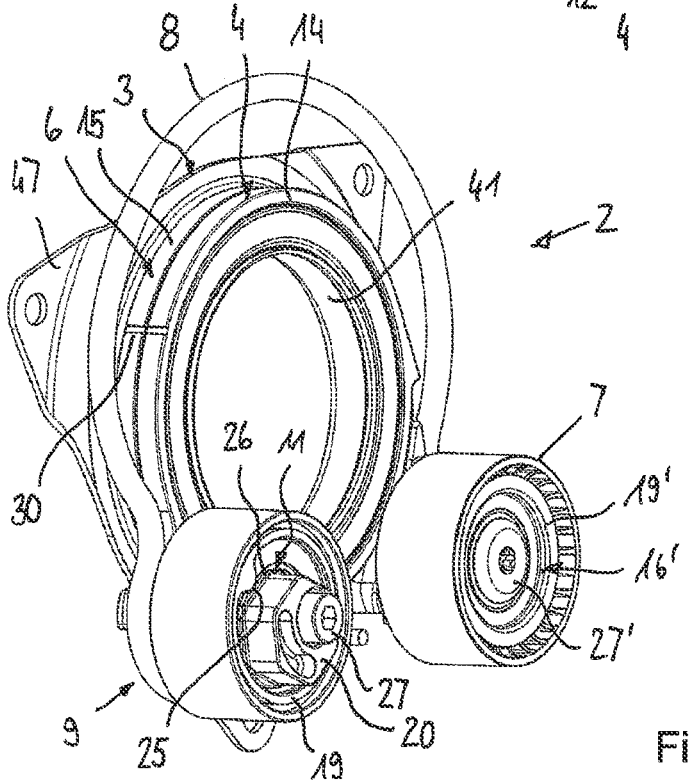
Figure 4D:
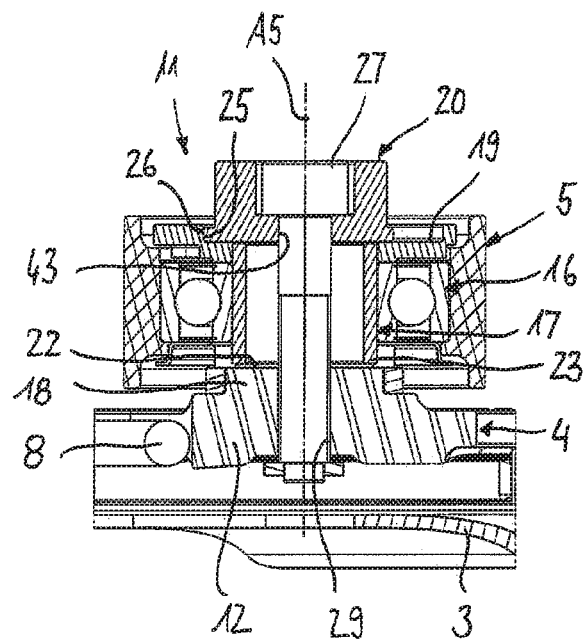
Figure 4C:
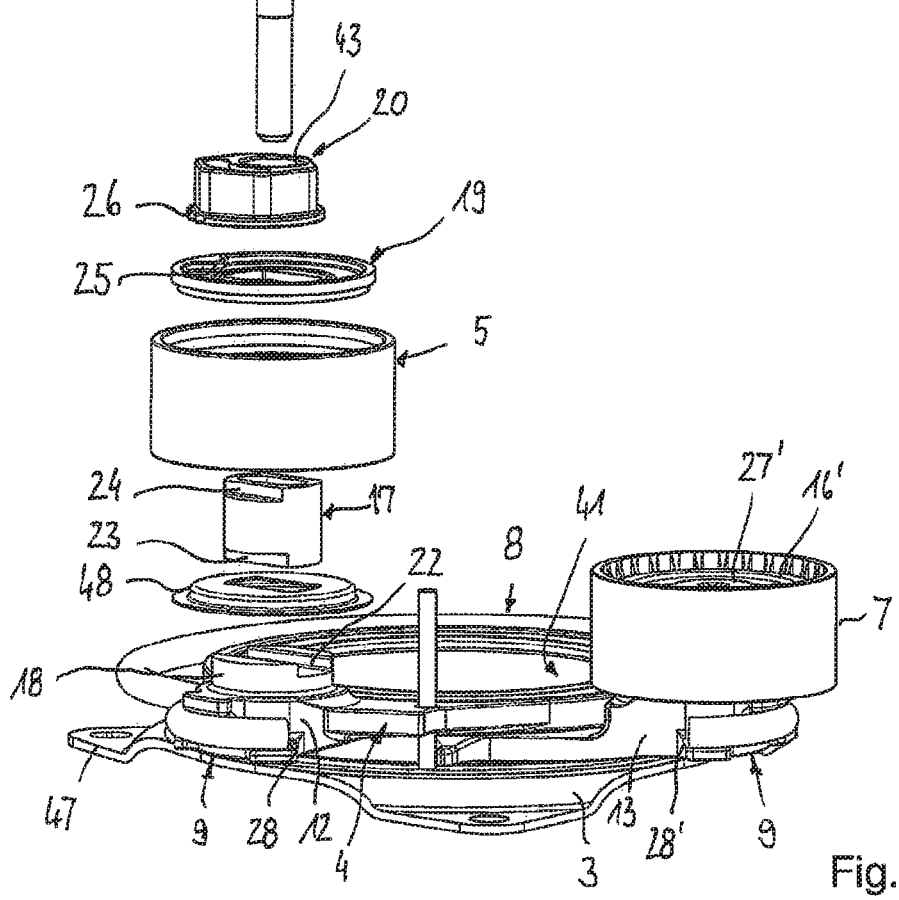

It can be seen in particular in FIG. 4A that engagement means 31 are provided between the eccentric nut 20 and the cover disc 19. The engagement mean 31 are formed by an engagement structure on an outer face of the eccentric curve 26, into which the radially projecting support face 25 can lockingly engage across the turning range of the eccentric nut 20 in partial steps. Thus, the eccentric nut 20 is held relative to the cover disc 19 in defined positions. An accidental turning after setting the nominal tensioning angle αset is thus prevented.

As with the above embodiment, the setting element 18 is designed as an extension projecting axially from the tensioning arm 4 with a guide contour 22 extending in circumferential direction. The bearing carrier 17 engages in the guide contour 22 with the fitting counter-contour 23, so that the bearing carrier 17 is guided relative to the tensioning arm 4 in a circumferential direction, tangentially relative to the pivot axis A4. The relative movement between the tensioning roller 5 and the tensioning arm 4 insofar takes place analogously to the above embodiment, to which description it is referred to.

Figure 5A:
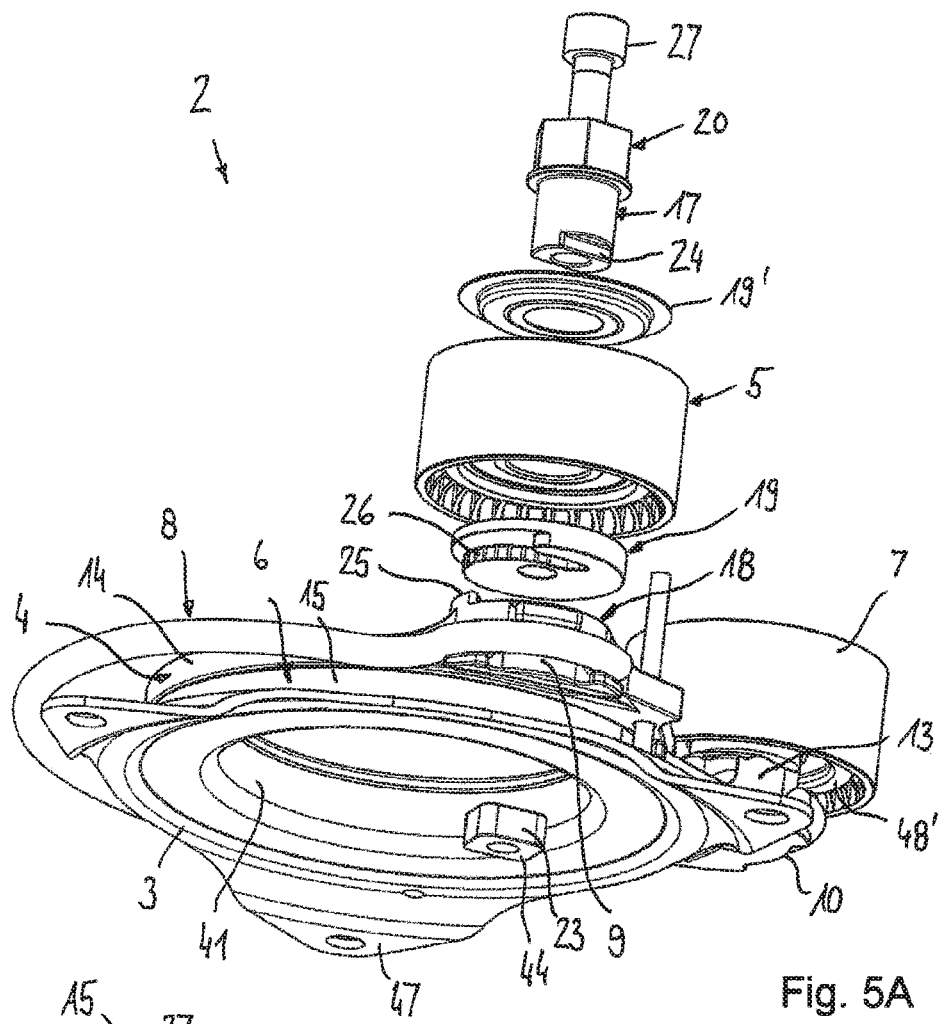
FIG. 5A: a belt tensioning device in a further embodiment in a perspective view, when seen diagonally from below, with adjustable tensioning roller in an exploded view.
Figure 5B:
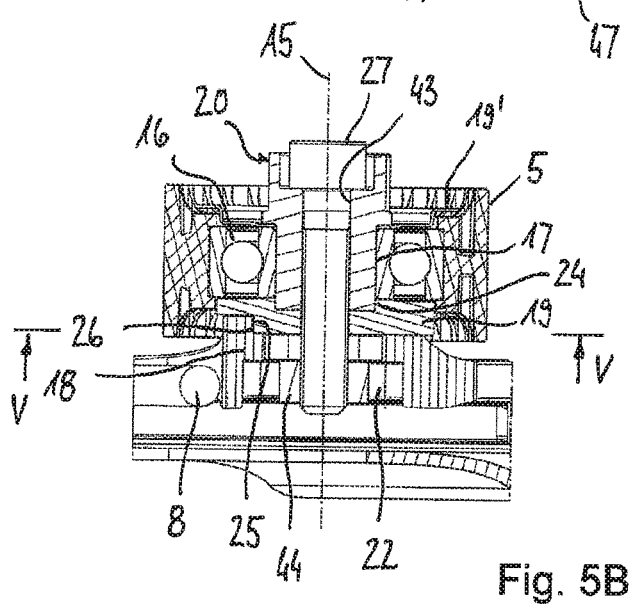
FIG. 5B: the adjustable tensioning roller of the belt tensioning device of FIG. 5A as a detail in a longitudinal section.

The FIGS. 5A to 5C, which are jointly described below, show a tensioning device 2 in a third embodiment. The present tensioning device 2 corresponds in large parts to the embodiment of FIG. 4, so that concerning the similarities, reference is made to the above description of FIG. 4 and thus also to the description of FIGS. 1 to 3. The same or one corresponding components are provided with the same reference signs as in FIGS. 1 to 4.

The present belt tensioner 2 according to FIG. 5 differs from the above embodiment in the design of the adjusting mechanism 11, in particular of the setting element 18, of the supporting element 19 and of the actuating element 20.

The actuating element 20 is, in the present embodiment, designed integral with the bearing carrier 17. Torque introduction means in the form of an external hexagon are provided for introducing a torque into the actuating element 20, without being limited thereto. The actuating element 20 has a through bore 43, through which the screw 27 is inserted for connection of the tensioning arm 4. The screw 27 and the supporting element 17 are arranged coaxially to each other, and/or to the axis of rotation A5. A nut 44 is screwed into the lower end of the screw 27, which is held in a rotationally fixed manner to the setting element 18, but so as to be displaceable along the guide structure 22 of the setting element 18 in circumferential direction to the pivot axis A4. The outer face 23 of the nut 44 forms the counter-contour of the guide.

In the present embodiment, the supporting element 19 is designed as a lower cover disc and is therefore located below the bearing 16, respectively between the bearing carrier 17 and the setting element 18. The cover disc 19 has an actuating structure 26 as an eccentric face, which is arranged eccentrically to the through bore for the screw 27. The cover disc 19 interacts with the setting element 18 as counter-component, to adjust the tensioning arm 4 relative to the tensioning roller 5. The setting element 18 is connected integrally with the tensioning arm 4 and has a support face 25, which is contacting the eccentric face 26 of the cover disc 19. The cover disc 19 is connected to the supporting element 17, respectively to the actuating element 20, by form-fitting means 24.

When the actuating element 20 is rotated, the eccentric setting curve 26 of the cover disc 19 moves along the support face 25 of the setting element 18, which is stationary to the tensioning arm 4, so that the setting element 18 is moved approximately in a circumferential direction relative to the cover disc 19, and/or to the screw 27, with respect to the pivot axis A4. Accordingly, the bearing carrier 17, which is fixedly connected to the cover disc 19, and the tensioning roller 15 are moved relative to the setting element 18 and the tensioning arm 4 connected thereto, along the guide 22, 23 formed between the setting element 18 and the nut 44. Depending on the turning direction of the actuating element 20 and the cover disc 19 connected thereto in a rotationally fixed manner, the eccentric setting curve 26 can be turned starting from a central setting position, in areas of smaller radii or larger radii, so that the spring 8 can be expanded or contracted accordingly.

Figure 5C:
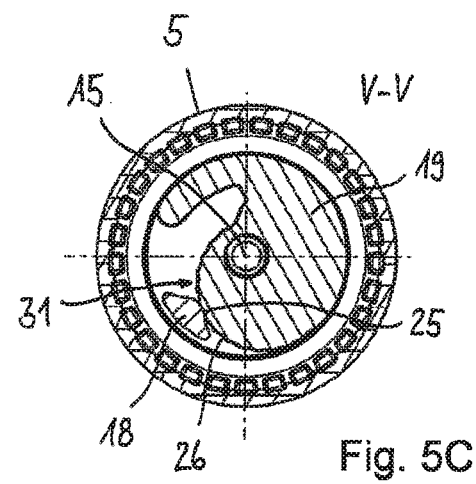
FIG. 5C: the adjustable tensioning roller of FIG. 5B in a cross-section through the setting contour.
Figure 8A:
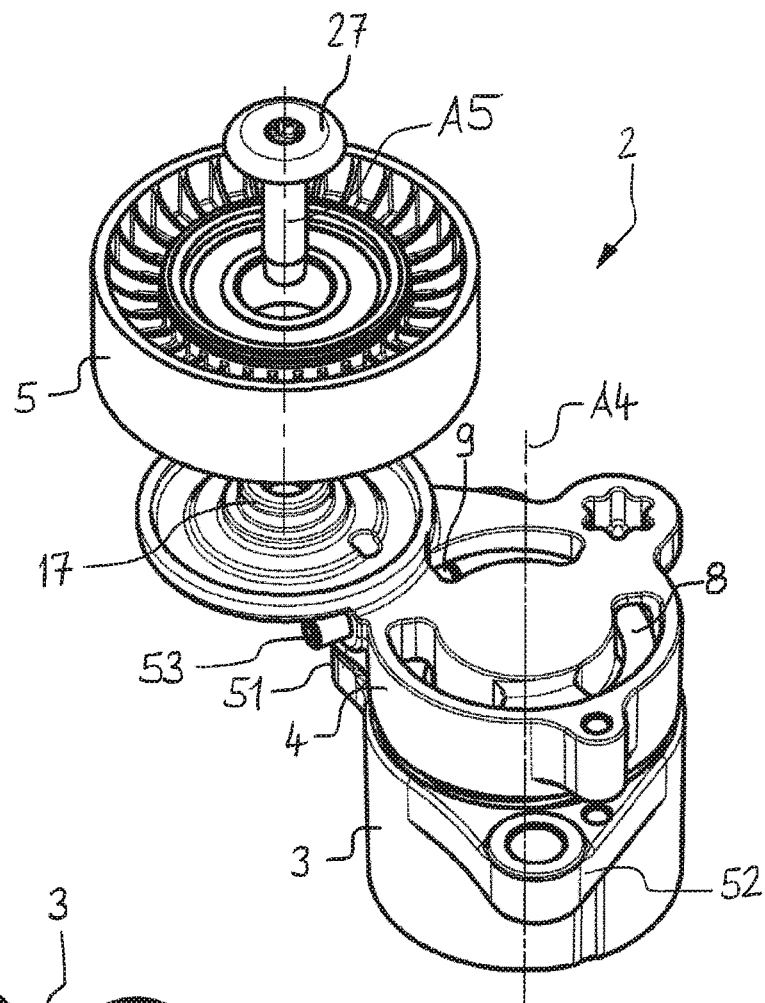
FIG. 8A: a belt tensioner in another embodiment in an exploded perspective view.
Figure 8B:
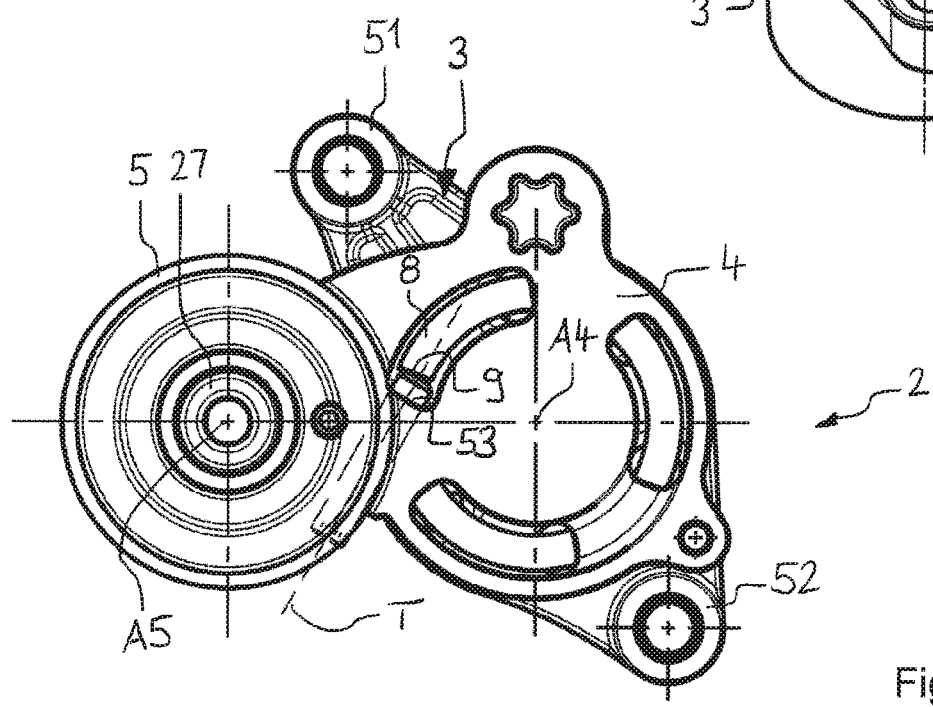
FIG. 8B: the belt tensioner from FIG. 8A in a top view.
Figure 8C:
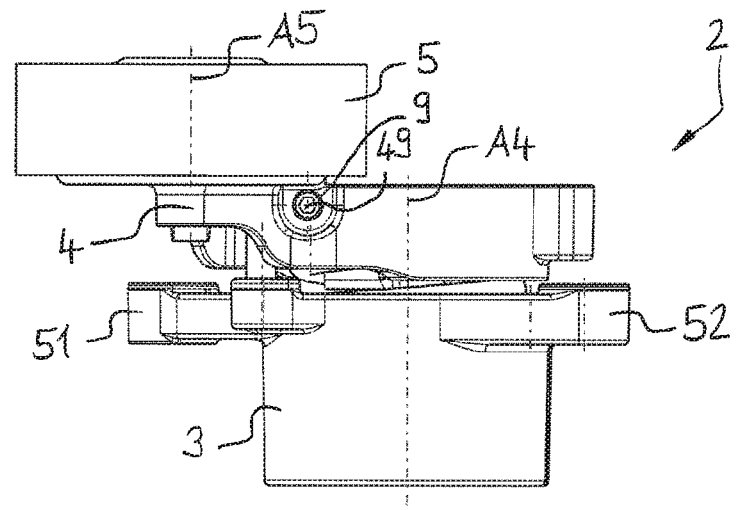
FIG. 8C: the belt tensioner from FIG. 8A in a side view.
Figure 8D:
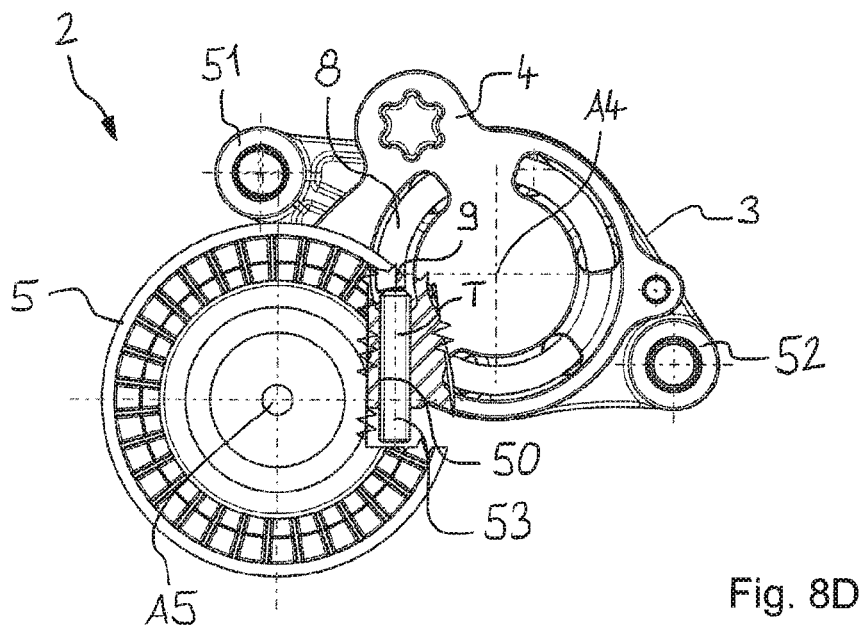
FIG. 8D: the belt tensioner from FIG. 8A in a top view in a partially sectioned view.

As can be seen in particular in FIG. 5C, the present embodiment is also provided with engagement means 31. The engagement means 31 are formed by an engagement structure on the eccentric curve 26 of the supporting element 19, in which the radially projecting counter-face 25 can lockingly engage in partial steps over the turning range of the supporting element 19. In this way, the cover disc 19 is held in defined rotary positions relative to the setting element 18.

The setting element 18 has a circumferentially extending guide contour 22 which is designed in the form of an elongated recess. The nut 44, with the fitting counter-contour 23, engages with the guide contour 22, so that the bearing carrier 17 is guided relative to the tensioning arm 4 in a circumferential direction, and/or tangentially, relative to the pivot axis A4. The relative movement between the tensioning roller 5 and the tensioning arm 4 is therefore analogous to the above embodiment, to which description it is referred.

FIGS. 6A and 6B, which are described jointly below, show a tensioning device 2 in a further embodiment. This tensioning device 2 corresponds in large parts to the embodiment of FIG. 1, so that with regard to the common features, reference is made to the above description of FIG. 1 and thus also to the description of FIGS. 2 and 3. The same, respectively modified details are provided with the same reference signs as in the above Figures.

In the present embodiment, the adjusting mechanism 11 is not arranged in the area of the tensioning roller, but relative thereto in a circumferentially off-set area between the two tensioning rollers 5, 7.

The adjusting mechanism 11 comprises, as in the above embodiments, a setting element 18 connected to the spring support 9, a supporting element 19 connected to the bearing carrier 17, and an actuating element 20 for adjusting the setting element 18 relative to the supporting element 19. The supporting element 19 is supported on one side on the setting element 18 and on the other side on the actuating element 20 in circumferential direction, which shall also include an indirect support.

In the present embodiment, the actuating element 20 has a sleeve portion, with which the actuating element 20 is rotatably supported on a threaded pin 45, and an actuating structure 26 in form of an eccentric face. The threaded pin 45 is fixed with a first end to the supporting element 19. On the opposite second end a screw thread is provided, onto which a clamping nut 46 is screwed. In the detached condition of the clamping nut 46, the actuating sleeve 20, and the setting element 18 connected thereto, can be turned. By tightening the clamping nut 46, the actuating sleeve 20 arranged between the nut 46 and the setting element 18, is clamped and thus secured against rotation. For introducing torque, the actuating sleeve 20 has an external hexagon, wherein also other torque contours are possible.

The eccentric face 26, which is arranged eccentrically to the threaded pin 45, interacts with the setting element 18 as a counter-component, to move the same in circumferential direction relative to the supporting element 19. The setting element 18 is formed as an annular segment, which is guided by means of guide means 22, 23; 22', 23' relative to the supporting element 19 in circumferential direction with limited movement. The annular segment 18 has an axial projection 25 at a side opposite to the guide, which forms the counter-element and against which the eccentric setting face 26 is supported. For guidance in the circumferential direction, the annular segment 18 has a first guide element 23 in the form of an axial projection which engages in a first elongated hole 22 of the supporting element 19, and circumferentially off-set thereto, a second guide element 23' in the form of an axial projection which engages in a second elongated hole 22' of the supporting element 19. The first guide element 23 is longer than the second and extends has a portion extending through the elongated hole 22. The projecting portion of the guide element 23 forms the first spring support 9 against which the spring 8 is supported in circumferential direction with a radially bent-off end portion.

The supporting element 19 is an integral part of the first tensioning arm 4, which via the spring 8 is resiliently supported in circumferential direction against the second tensioning arm 6, wherein the first tensioning arm 4 with the associated first spring support 9 is adjustable in a circumferential direction relative to the second tensioning arm 5 and the associated second spring support 10 by means of the adjusting mechanism 11. By turning the actuating sleeve 20, the eccentric setting curve 26 is turned relative to the counter-face 25 of the annular segment 18, so that the annular segment 18 is moved relative to the threaded pin 45 in a circumferential direction with respect to the pivot axis A4. Accordingly, the annular segment 18 and the spring support 9 connected thereto are moved relative to the threaded pin 45 and to the tensioning arm 4 connected thereto, along guides 22, 23; 22', 23' formed between the supporting element 19 and the annular segment 18. Depending on the turning direction of the actuating element 20, the eccentric setting curve 26 can be rotated, starting from a central setting portion, into areas of smaller radii or larger radii, so that the spring 8 can be expanded or contracted accordingly. The relative movement between the tensioning roller 5 and the tensioning arm 4 takes place analogously to the above embodiment, to which description it is referred.

FIG. 6B also shows a marking element 30' which in the form of a triangle bent axially from the annular segment 18. After adjusting the desired angle position αset, in which the nominal torque Mset is available, a counter-marking 30 is made on the opposite tensioning arm 6 as part of the presetting. During final assembly, the nominal torque Mset can thus be easily set by turning the actuating sleeve until the marking element 30' is arranged opposite to the counter-marking 30.

FIG. 7 shows a tensioning device 2 according to the invention in a further embodiment. The present tensioning device 2 corresponds in large parts to the embodiment of FIG. 4, to which description and thus also the description of FIGS. 1 to 3 abbreviated reference is made with regard to the common features. The same or modified details are provided with the same reference signs as in the above Figures.

The tensioning device of the present embodiment has only one tensioning arm 4 with corresponding tensioning roller 5. The first spring support 9 is assigned to the first tensioning arm 4, as in the above embodiments. The second spring support 10 is assigned to the base member 3, respectively is formed thereon (and not, as in the above embodiments on the second tensioning arm).

Figure 2:
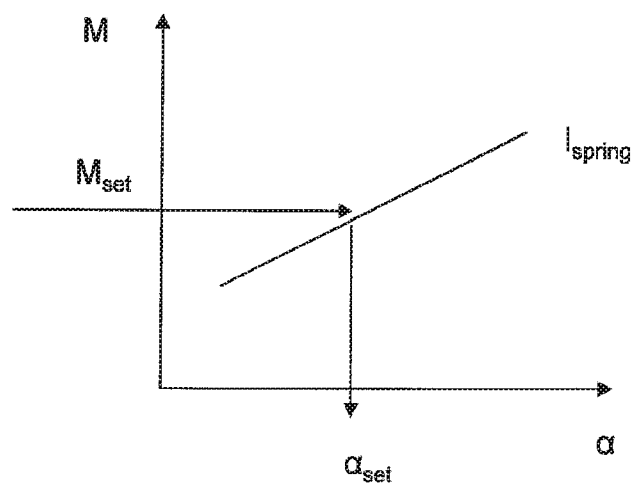
FIG. 2: a torque characteristic curve (Ispring) for determining a nominal angular position for setting the spring pre-tension for a belt tensioning device.

With regard to all other details of the design and function, the tensioning device according to FIG. 7 corresponds to that of FIG. 4, to which description in combination with the description of FIGS. 1 to 3 it is referred abbreviatedly.

FIGS. 8A to 8D show an inventive belt tensioning device 2 in another embodiment. The shown tensioning device 2, as well as the tensioning device shown in FIG. 7, is a single-arm tensioner and corresponds in large parts to the embodiment shown in FIG. 7, wherein reference is made to the description of the embodiment shown in FIG. 7 and thus also to the description of FIGS. 1 to 4 with regard to the common features. The same or modified details are provided with the same reference signs as in the figures above.

The belt tensioner 2 has a base member 3 in the form of a receiving housing for the spring means 8, which are designed as a coil spring. A tensioning arm 4 is arranged on the base member 3 so as to be rotatable about the pivot axis A4. The tensioning arm 4 carries at one free end and eccentrically to the pivot axis A4 the tension roller 5, which is rotatably mounted on the bearing carrier 17 of the tension arm 4. The base member 3 can be fixed to a stationary component such as an accessory or engine block (not shown) or a component connected thereto. For attaching the base member 3, it has several radially outwardly projecting attachment portions 51, 52 with holes through which screws or bolts can be inserted for attachment to the stationary component.

The spring means 8 are supported on the one side against a first spring support 9 of the tension arm 4. The first spring support 9 comprises a threaded pin 53 which is screwed into a threaded bore 50 of the tensioning arm 4. The spring means 8 are essentially supported tangentially against the threaded pin 53. The threaded pin 53 has an internal hexagon 49 by which, with an appropriate tool, the threaded pin 53 can be more or less screwed into the threaded bore 50 in the direction of a tangent T. This changes the tangential position of the first spring support 9, in particular the contact point between the threaded pin 53 and the spring means 8, relative to the bearing carrier 17 and the tension roller 5.

The spring means 8 are supported tangentially against a second spring support (not shown here) arranged in the base member 3 and thus in circumferential direction relative to the pivot axis A4. With the tensioning arm 4 held stationary to the base member 3, respectively the tension roller 5 held stationary to the base member 3, as is the case in the mounted condition of the belt tensioner 2 in a traction drive, the spring means 8 are thus more or less pretensioned in the circumferential direction. This is achieved by adjusting the threaded pin 53 and thus adjusting the spring support 9 to change the length respectively the distance between the first spring support 9 and the second spring support in the circumferential direction.

REFERENCE NUMERALS LIST 2 belt tensioning device
3 base member
4 first tensioning arm
5 first tensioning roller
6 second tensioning arm
7 second tensioning roller
8 spring
9 spring support
10 spring support
11 adjusting mechanism
12 carrier portion
13 carrier portion
14 bearing portion
15 bearing portion
16, 16' bearing
17 bearing carrier
18 setting element
19 supporting element
20 actuating element
21 through opening
22 guide contour
23 counter-contour
24 engagement means
25 support structure
26 actuating structure
27 attachment element
28, 28' stop
29 threaded bore
30 marking
31 engagement means
32 belt drive
33 accessory
34 belt
35 belt pulley
36 belt pulley
37 belt pulley
38 belt
39 housing
40 screw
41 opening
42 opening
43 through bore
44 nut
45 threaded pin
46 clamping nut
47 attachment portion
48 cover disc
49 internal hexagon
50 threaded bore
51 attachment portion
52 attachment portion
53 threaded pin
α, β, γ angle
A axis
L length
M torque
P position
R radius
T tangent

The invention claimed is:

1. A tensioning device for a traction drive, comprising:
   a base member;
   at least one tensioning arm which is pivotably supported relative to the base member about a pivot axis and comprises a tensioning roller which is rotatably supported on a bearing carrier of the tensioning arm;
   a spring arranged to resiliently load the tensioning arm, wherein the spring extends between a first spring support of the tensioning arm and a second spring support of the tensioning device about the pivot axis, and
   an adjusting mechanism arranged to adjust the first spring support relative to the bearing carrier of the tensioning roller in a circumferential direction about the pivot axis.

2. The tensioning device of claim 1, wherein the adjusting mechanism has a setting element that is rigidly connected to the first spring support, a supporting element that is rigidly connected to the bearing carrier, wherein the setting element is adjustably guided in the circumferential direction about the pivot axis relative to the supporting element, and an actuating element arranged to adjust the setting element relative to the supporting element.

3. The tensioning device of claim 2, wherein an engagement mechanism is provided in a force transmission path between the actuating element and the setting element, which is configured to hold the setting element in defined positions with respect to the supporting element.

4. The tensioning device of claim 1, wherein the first spring support and the first tensioning roller are adjustable relative to each other up to 10° about the pivot axis.

5. The tensioning device of claim 1,
wherein a stop is formed between the first spring support and the spring, wherein a tangent through the stop is definable as a perpendicular to the radius from the pivot axis to the stop, and
wherein the adjusting mechanism is formed such that, starting from a starting position, the stop has a direction of movement, in an axial view, that lies within an angle range ($\gamma$) of up to ±10° relative to the tangent.

6. The tensioning device of claim 1, wherein the bearing carrier has an axial through opening elongatedly extending in the circumferential direction.

7. The tensioning device of claim 2, wherein the actuating element is attached stationarily and rotatably to the tensioning arm and has an actuating structure that interacts with a counter-structure of a counter-component connected to the bearing carrier for moving together such that rotation of the actuating element and of the actuating structure connected thereto in a rotationally fixed manner causes a circumferential movement of the tensioning arm relative to the bearing carrier about the pivot axis.

8. The tensioning device of claim 7, wherein the actuating element has a toothed structure as the actuating structure that interacts with a tooth segment of the counter-component, wherein the counter-component is an upper cover disc for the tensioning roller.

9. The tensioning device of claim 7, wherein the actuating element has an eccentric face structure as the actuating structure that interacts with a counter-face of the counter-component, wherein the counter-component is an upper cover disc for the tensioning roller.

10. The tensioning device of claim 7,
wherein the actuating element is firmly connected to the bearing carrier, and the bearing carrier is non-rotatably connected to the setting element, wherein the setting element is a lower cover disc for the tensioning roller, and the actuating structure is formed on the lower cover disc as an eccentric face structure,
wherein the counter-structure is a counter-face on the supporting element on which the eccentric face structure is supported.

11. The tensioning device of claim 1, wherein the at least one tensioning arm and the base member each have an opening into which at least one of a drive shaft and a pulley of an accessory can extend in the mounted condition.

12. The tensioning device of claim 1, wherein the spring is designed in the form of a bending spring that extends in the circumferential direction about the pivot axis between the first spring support and the second spring support and has a circumferential extension of less than 980°.

13. The tensioning device of claim 1, wherein only a single tensioning arm is provided, wherein the second spring support, against which the spring is supported in the circumferential direction, is assigned to the base member.

14. The tensioning device of claim 1,
wherein the at least one tensioning arm comprises a first tensioning arm and a second tensioning arm,
wherein the first tensioning arm is pivotably supported around a first pivot axis and comprises a first tensioning roller, and the second tensioning arm is pivotably supported around a second pivot axis and comprises a second tensioning roller, and
wherein the second spring support, against which the spring is supported in the circumferential direction, is assigned to the second tensioning arm, so that the two tensioning arms are resiliently supported relative to each other in the circumferential direction via the spring.

15. A method for adjusting the torque of a tensioning device, wherein the tensioning device comprises: a base member; at least one tensioning arm which is pivotably supported relative to the base member about a pivot axis and comprises a tensioning roller which is rotatably supported on a bearing carrier of the tensioning arm; a spring arranged to resiliently load the tensioning arm, wherein the spring extends between a first spring support of the tensioning arm and a second spring support of the tensioning device about the pivot axis, and an adjusting mechanism arranged to adjust the first spring support relative to the bearing carrier of the tensioning roller in a circumferential direction about the pivot axis, the method comprising the following steps:
determining a target torque for the tensioning device in a mounted condition;
measuring the actual torque of the tensioning device across a pivot angle of the tensioning arm when pivoting the tensioning arm relative to the component against which the spring is supported;
pivoting the tensioning arm relative to the component up to a target pivot angle at which the target torque is attained; and
applying a marking representing the target pivot angle to the tensioning device.

16. The method of claim 15, further comprising:
assembling the tensioning device in a belt drive, and
adjusting the tensioning arm relative to the tensioning roller by the adjusting mechanism until the marking representing the desired pivot angle is reached.

* * * * *